Aug. 14, 1934.  C. WEIDAUER  1,970,408
PINKING SHEARS
Filed Sept. 19, 1931  2 Sheets-Sheet 1
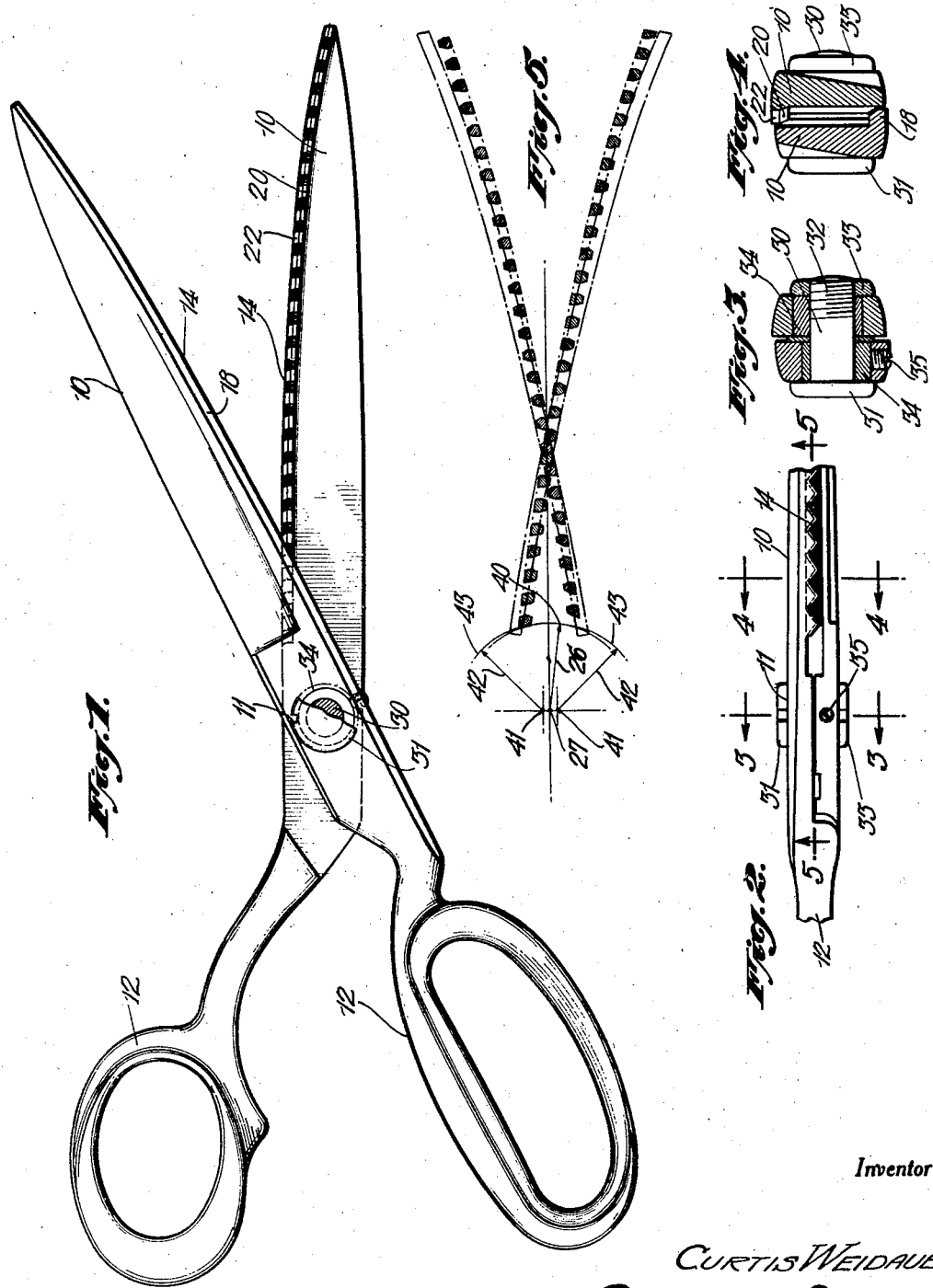
Inventor
CURTIS WEIDAUER
By Clarence A. O'Brien
Attorney Aug. 14, 1934.                C. WEIDAUER                1,970,408
                              PINKING SHEARS
                       Filed Sept. 19, 1931      2 Sheets-Sheet 2
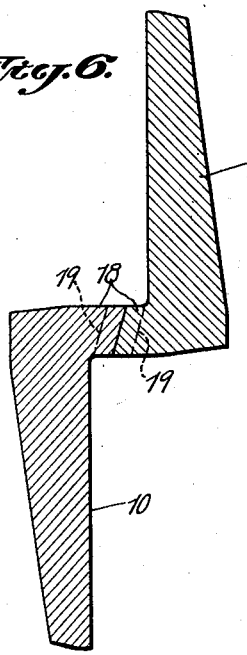
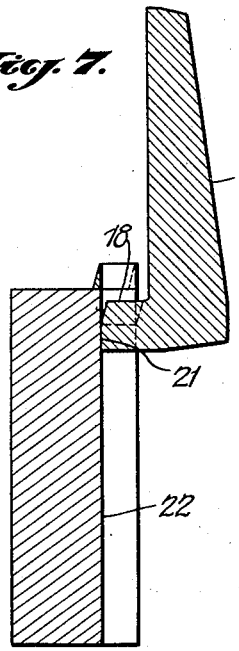
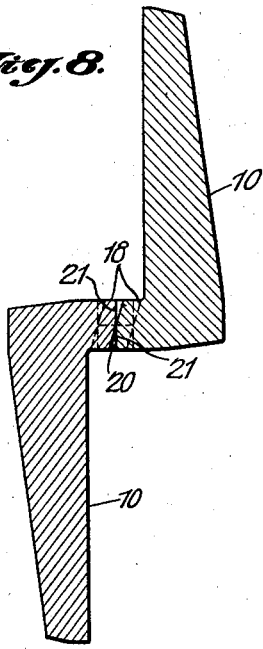
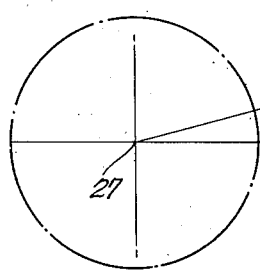
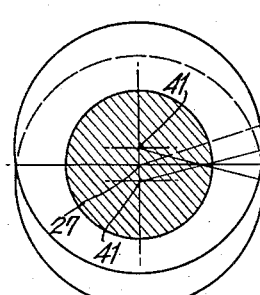
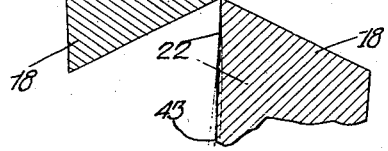
Inventor
CURTIS WEIDAUER.
By Clarence A. O'Brien
Attorney Patented Aug. 14, 1934

1,970,408

UNITED STATES PATENT OFFICE 1,970,408

PINKING SHEARS

Curtis Weidauer, New York, N. Y., assignor, by direct and mesne assignments, to Samuel Briskman, Brooklyn, N. Y.

Application September 19, 1931, Serial No. 563,829

1 Claim. (Cl. 164—81)

The present invention relates to new and useful improvements in hand tools and more particularly it pertains to a new and improved form of shears for cutting a pinked edge upon materials.

It is one of the objects of the present invention to provide a new and improved form of pinking shears and similar tools, in which the cutting blades may be adjusted relatively to each other.

It is a further object of the invention to provide a pair of shears of the aforementioned character in which the cutting blades or edges are formed integral with the jaws of the shears.

It is a further object of the invention, so to construct a pair of shears of the aforementioned type that the blades are relatively thin thus permitting of use of the shears for pinking the edges of material closely adjacent to seams.

It is a still further object of the invention, so to construct a pair of shears of the aforementioned type that the cutting edge of each shear blade is offset with respect to the axis about which the blade operates, and to provide means whereby the arc upon which the shear blades operate may be changed or adjusted.

With the above and other objects in view, reference will be had to the accompanying drawings, in which:

Figure 1 is a view in elevation partly in section illustrating a pair of pinking shears constructed in accordance with the present invention, Figure 2 is a detail plan view of a portion of said shears, Figure 3 is a transverse sectional view taken on the line 3—3 of Figure 2, Figure 4 is a transverse sectional view taken on the line 4—4 of Figure 2, Figure 5 is a schematic longitudinal sectional view taken through the cutting edges of the scissors blades, on the line 5—5 of Figure 2, Figures 6, 7 and 8 are transverse sectional views on an enlarged scale, taken through the blades of a scissors constructed in accordance with the present invention and illustrating different steps in the manufacture of the blades, Figure 9 is a schematic longitudinal sectional view showing the lapping operation of the blades.

Figure 10 is a view similar to Figure 9 illustrating the blades adjusted to cutting position, and;

Figure 11 is a transverse sectional view illustrating the manner in which the blades clear during the cutting operation.

Referring more specifically to the drawings, the device comprises a pair of blades 10 which are pivotally connected together as at 11, and provided with operating handles 12 after the manner of an ordinary pair of scissors or shears. The cutting edges of the blades 10 are designated 14 in the drawings, and as best illustrated in Figure 2, these cutting edges are of the zig-zag type, although they may be of other desired forms. The cutting edge 14 of each of the blades is formed upon an integral flange 18 which is positioned at substantially right angles to its respective blade as best illustrated in Figure 4 of the drawings.

The zig-zag cutting edge of each blade is formed upon the outer or free edge of the flange 18, and is undercut as indicated by dash lines 19 in Figure 6, and by the reference numeral 20 where this undercut portion appears in the other figures of the drawings. In its initial formation, these undercut portions are in the form of a continuous beveled portion, and are preferably of uniform character, that is to say, that the angle of the bevel of all blades, or at least all blades of a given lot is substantially the same.

After the blades have been thus far formed, the undercut or beveled portion 20 of each blade is formed with a relatively straight face such as 21, this face being preferably formed by relative movement of a blade being operated upon and a suitable shearing tool such as 22 in Figure 7. When the shearing operation has been completed the blades are paired, and by means of a suitable device not herein illustrated, the blades of each pair are lapped together until their corresponding relatively straight faces are of substantially the same character and provide a wiping contact substantially throughout the entire area of both of said straight faces as the blades pass by each other during the lapping operation.

In Figure 9 of the drawings, I have illustrated schematically this lapping operation and in this figure, the reference numeral 25 designates the arc upon which this lapping operation takes place, 26 indicating the radius of the arc, and 27 the axis thereof.

I have found by actual test that if a pair of blades formed as above described be pivotally connected together to operate through the same arc as that upon which they were lapped, a satisfactory cutting or shearing operation cannot generally be obtained. I have found, however, and by actual test that if two such blades be pivotally connected together in such a manner that each moves through an arc which is eccentric with relation to the arc upon which the blades were lapped the actual cutting edges 14 of the blades clear each other immediately and a highly efficient shearing or cutting action can thus be obtained.

Inasmuch as the lapping operation heretofore referred to is carried out upon a number of different machines, the lapping of all blades is not uniform, and therefore the degree of eccentricity of the cutting arc of the several pairs of blades is not the same, and cannot be definitely determined for any particular pair of blades. I have provided a novel means for pivotally connecting the blades together which means also operates to permit of adjustment of the blades of a pair of blades in order that they may be off set with relation to each other to the required extent to produce an efficient cutting relation between the blades.

In the present embodiment of the invention, this pivoted means comprises a bolt or pin 30 having a head 31, and a screw threaded end 32 for the reception of a nut 33. This bolt or pin passes through the blades 10, and interposed between each blade and the bolt or pin, there is an eccentric bushing 34. At least one of these eccentric bushings 34 is rotatably mounted with relation to its blade, and if desired, both bushings may be so constructed.

It will be obvious that adjustment of one or both of the bushings 34 will vary the position of the axis of the arc through which each blade moves during a cutting operation.

Means is provided for retaining the adjustable eccentric bushing in the position to which it is adjusted, and in the present embodiment of the invention this means consists of a set screw, bolt or the like 35 threaded into one of the blades, and movable into and out of engagement with that bushing carried by the blade in which the set screw 35 is mounted.

The foregoing operations are illustrated schematically in Figures 5, 9 and 10, and in said Figures, 27 designated the axis of the arc through which the blades are moved during the lapping operation. The radius of this arc is designated 26, the arc itself being designated 43.

After one, or both of the bushings 34 have been adjusted, it will be apparent that, each blade operates through an arc having its own axis each of which is off-set or spaced with respect to the axis of the arc upon which the blades were lapped. These axes are designated 41 in the drawings, their radii being designated 42, the arc of each being designated 40.

The aforementioned adjustment of the blades so positions the blades relatively to each other, that the cutting edges of the blades meet and immediately clear as illustrated schematically in Figure 11, thus insuring a perfect operation of the shears. Furthermore, the adjustability of the blades provides for readjustment within certain limits to compensate for wear of the cutting edges of the blades.

From the foregoing, it will be readily apparent that the present invention provides a novel tool in the form of a pair of shears which will produce an irregularly cut edge, and in which the blades of the tool may be relatively adjusted to obtain, and to maintain proper working relation between the blades.

While the invention has been herein illustrated in a preferred form, it is to be understood that the invention is not to be limited to the construction herein shown, and that it may be practiced in other forms without departing from the spirit thereof.

Having thus described the invention, what is claimed as new and what it is desired to secure by Letters-Patent of the United States, is;

Pinking shears comprising a pair of pivotally connected blades a relatively thin and narrow integral flange extending throughout the inner edge of each of said blades, each of said flanges projecting at substantially right angles from its respective blade, a plurality of serrations formed in and extending entirely through each of said flanges, to provide a serrated cutting edge for the shears, and an undercut face receding from each side wall of each serration whereby to provide immediate clearing of the cutting edges during a cutting operation.

CURTIS WEIDAUER.